US006295552B1

United States Patent
Shibata

(10) Patent No.: US 6,295,552 B1
(45) Date of Patent: *Sep. 25, 2001

(54) GATEWAY APPARATUS FOR TRANSFERRING VOICE MAIL TO AN ELECTRONIC MAIL SERVER OR TRANSFERRING ELECTRONIC MAIL TO A VOICE MAIL APPARATUS

(75) Inventor: Satoru Shibata, Tokorozawa (JP)

(73) Assignee: Ricoh Company, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/716,608

(22) Filed: Sep. 19, 1996

(30) Foreign Application Priority Data

Sep. 22, 1995 (JP) .................................................... 7-244295

(51) Int. Cl.⁷ ........................... G06F 15/16; H04M 11/00
(52) U.S. Cl. ........................................ 709/206; 379/88.14
(58) Field of Search ............................ 379/89, 88, 88.12, 379/88.13, 88.14, 88.25, 88.18, 88.17, 88.24, 88.16; 395/200.35, 200.36; 709/206, 207

(56) References Cited

U.S. PATENT DOCUMENTS

| 4,837,798 | * | 6/1989 | Cohen et al. ........................... 379/88 |
| 5,333,266 | * | 7/1994 | Boaz et al. ............................. 395/200 |
| 5,349,636 | * | 9/1994 | Irribarren ............................... 379/89 |
| 5,475,738 | * | 12/1995 | Penzias ................................... 379/67 |
| 5,479,411 | * | 12/1995 | Klein ................................... 370/110.1 |
| 5,557,659 | * | 9/1996 | Hyde-Thomson ....................... 379/88 |
| 5,608,786 | * | 3/1997 | Gordon ................................. 379/100 |
| 5,647,002 | * | 7/1997 | Brunson ................................. 380/49 |

FOREIGN PATENT DOCUMENTS 1-293063   11/1989   (JP) .

OTHER PUBLICATIONS

English language abstract of Japanese '063 document.

* cited by examiner

Primary Examiner—Dung C. Dinh
Assistant Examiner—Kenneth W. Fields
(74) Attorney, Agent, or Firm—Dickstein Shapiro Morin & Oshinsky LLP

(57) ABSTRACT

A gateway apparatus which transfers voice mail to an electronic mail server as electronic mail so that the voice mail can be accessed from a remote place by a simple operation. The gateway apparatus is connected between the electronic mail server and a public telephone network. The gateway apparatus communicates with a voice mail apparatus via a telephone line. The electronic mail server is connected to at least one personal computer. Voice mail addressed to a selected user is retrieved from the voice mail apparatus. The voice mail is converted into electronic mail, and a voice mail box number corresponding to the retrieved voice mail is converted into an electronic mail address which is assigned for the selected user. The electronic mail converted from the voice mail is transferred to the electronic mail server so that the electronic mail is distributed to a personal computer connected to the electronic mail server in accordance with the converted electronic mail address. Reversely, electronic mail received by the personal computer may be converted into voice mail, and transferred to the voice mail apparatus.

10 Claims, 7 Drawing Sheets

GATEWAY APPARATUS FOR TRANSFERRING VOICE MAIL TO AN ELECTRONIC MAIL SERVER OR TRANSFERRING ELECTRONIC MAIL TO A VOICE MAIL APPARATUS

BACKGROUND OF THE INVENTION

1. Field of the Invention

The present invention generally relates to a gateway apparatus and, more particularly, to a gateway apparatus which converts voice mail into electronic mail so as to transfer the voice mail data to an electronic mail server distributing electronic mails to personal computers connected thereto. The present invention also relates to a gateway apparatus which converts a text file of electronic mail into voice mail so as to store the voice mail data in a voice mail apparatus.

2. Description of the Related Art

Recently, personal computers are being connected to a network so that users can communicate with each other by using electronic mail. Since a capability of personal computers and networks has been improved, multimedia oriented communications, such as communications of static image data, dynamic image data and voice data, have become more popular for the communications between personal computers as well as a mail exchange based on text file data.

Conventionally, as a technique for transmitting audio data via the electronic mail communications between personal computers, a technique disclosed in Japanese Laid-Open Patent Application No. 1-293063 is known. According to this technique, an audio file is produced by using an audio processing apparatus provided in a personal computer. The audio file is attached to an electronic mail file so that the audio file is transmitted through the personal computer via electronic mail.

In the above-mentioned conventional technique, the audio file can be accessed via each personal computer connected to the network such as a local area network. However, this technique requires a microphone as a voice inputting device and a soundboard as an interface between the voice inputting device and the personal computer. That is, the microphone and the soundboard must be attached to each personal computer.

Additionally, there is a system in which a personal computer is provided with a soundboard and voice data output from a telephone is received by a personal computer via the soundboard as electronic mail through an existing telephone line. In this system, the contents of the voice data stored in the personal computer cannot be accessed from a remote place. Additionally, a telephone line must be connected to each personal computer.

SUMMARY OF THE INVENTION

It is a general object of the present invention to provide an improved and useful gateway apparatus in which the above-mentioned problems are eliminated.

A more specific object of the present invention is to provide a gateway apparatus which is provided between a telephone network and a conventional computer network system so that voice mail can be transferred to a personal computer as electronic mail and the transferred voice mail can be accessed from a remote place by a simple operation.

Another object of the present invention is to provide a gateway apparatus which generates a voice mail message when a personal computer receives electronic mail and stores the message in a voice mail apparatus so that a user can receive the voice mail message via a telephone from a remote place.

Another object of the present invention is to provide a gateway apparatus which converts text file data contained in electronic mail into voice mail data, and stores the voice mail data in a voice mail apparatus so that a user can access the contents of the electronic mail by telephone from a remote place.

In order to achieve the above-mentioned objects, there is provided according to one aspect of the present invention a gateway apparatus connected between an electronic mail server and a public telephone network, the gateway apparatus communicating with a voice mail apparatus via a telephone line, the electronic mail server being connected to at least one personal computer, the gateway apparatus comprising:

voice mail retrieving means for retrieving voice mail addressed to a selected user from the voice mail apparatus;

voice mail converting means for converting the voice mail into electronic mail;

box number converting means for converting a voice mail box number corresponding to the retrieved voice mail into an electronic mail address which is assigned for the selected user; and transferring means for transferring the electronic mail to the electronic mail server so that the electronic mail is distributed to the personal computer connected to the electronic mail server in accordance with the electronic mail address obtained by the box number converting means.

According to the above-mentioned invention, since voice mail is converted into electronic mail and the converted voice mail is distributed to a corresponding personal computer, a user can access both the voice mail and the electronic mail through the personal computer. The access to the voice mail can be made without providing a voice output device to the personal computer.

In one embodiment, a retrieval of the voice mail for each user is periodically performed at a predetermined time interval.

Additionally, the box number converting means may convert the voice mail box number into the electronic mail address in accordance with a predetermined address conversion table.

Further, the voice mail converting means may convert an analog voice signal corresponding to the voice mail into digital data conforming to electronic mail.

The above-mentioned gateway apparatus may further comprise:

unaccessed electronic mail searching means for searching unaccessed electronic mail which was received by the electronic mail server and has not been accessed by a particular user to whom the unaccessed electronic mail is addressed;

electronic mail address converting means for converting an electronic mail address corresponding to the unaccessed electronic mail into a voice mail box number which is assigned to the particular user; and message outputting means for outputting to the voice mail apparatus a voice message announcing a presence of the unaccessed electronic mail so that the voice message is stored at a voice mail box number of the particular user.

According to this invention, a user can check whether electronic mail addressed to him or her has been received by his or her personal computer, through a voice mail system by telephone.

In one embodiment, the electronic mail address converting means may convert the electronic mail address into the voice mail box number in accordance with a predetermined address conversion table.

The voice message may be an analog voice signal conforming to voice mail.

The above-mentioned gateway apparatus may further comprise:

unaccessed electronic mail retrieving means for retrieving unaccessed electronic mail which was received by the electronic mail server and has not been accessed by a particular user to whom the unaccessed electronic mail is addressed;

text file converting means for converting a text file contained in the unaccessed electric mail into a voice signal;

electronic mail address converting means for converting an electronic mail address corresponding to the unaccessed electronic mail into a voice mail box number which is assigned to the particular user; and voice signal outputting means for outputting the voice signal to the voice mail apparatus so that the voice signal is stored at a voice mail box number of the particular user.

According to this invention, a user can access the contents of the electronic mail addressed to him or her through a voice mail system by telephone. In this case, no interfacing device such as a modem is needed since the text file, which corresponds to the contents of the electronic mail, is converted into the form of voice mail. Thus, a user can access both the voice mail and the electronic mail by a single telephone call.

In one embodiment, the electronic mail address converting means may convert the electronic mail address into the voice mail box number in accordance with a predetermined address conversion table.

The voice signal may be an analog voice signal conforming to voice mail.

Additionally, there is provided according to another aspect of the present invention a gateway apparatus connected between an electronic mail server and a public telephone network, the gateway apparatus communicating with a voice mail apparatus via a telephone line, the electronic mail server being connected to at least one personal computer, the gateway apparatus comprising:

unaccessed electronic mail searching means for searching for unaccessed electronic mail which was received by the electronic mail server and has not been accessed by a particular user to whom the unaccessed electronic mail is addressed;

electronic mail address converting means for converting an electronic mail address corresponding to the unaccessed electronic mail into a voice mail box number which is assigned to the particular user; and message outputting means for outputting to the voice mail apparatus a voice message announcing a presence of the unaccessed electronic mail so that the voice message is stored at a voice mail box number of the particular user.

According to this invention, a user can check whether electronic mail addressed to him or her has been received by his or her personal computer, through a voice mail system by telephone.

In one embodiment, the electronic mail address converting means may convert the electronic mail address into the voice mail box number in accordance with a predetermined address conversion table.

The voice message may be an analog voice signal conforming to voice mail.

Additionally, there is provided according to another aspect of the present invention a gateway apparatus connected between an electronic mail server and a public telephone network, the gateway apparatus communicating with a voice mail apparatus via a telephone line, the electronic mail server being connected to at least one personal computer, the gateway apparatus comprising:

unaccessed electronic mail retrieving means for retrieving unaccessed electronic mail which was received by the electronic mail server and has not been accessed by a particular user to whom the unaccessed electronic mail is addressed;

text file converting means for converting a text file contained in the unaccessed electric mail into a voice signal;

electronic mail address converting means for converting an electronic mail address corresponding to the unaccessed electronic mail into a voice mail box number which is assigned to the particular user; and voice signal outputting means for outputting the voice signal to the voice mail apparatus so that the voice signal is stored at a voice mail box number of the particular user.

According to this invention, a user can access the contents of the electronic mail addressed to him or her through a voice mail system by telephone. In this case, no interfacing device such as a modem is needed since the text file, which corresponds to the contents of the electronic mail, is converted into the form of voice mail.

In one embodiment, the electronic mail address converting means may convert the electronic mail address into the voice mail box number in accordance with a predetermined address conversion table.

The voice signal may be an analog voice signal conforming to voice mail.

Other objects, features and advantages of the present invention will become more apparent from the following detailed description when read in conjunction with the accompanying drawings.

DETAILED DESCRIPTION OF THE PREFERRED EMBODIMENTS

Figure 1:
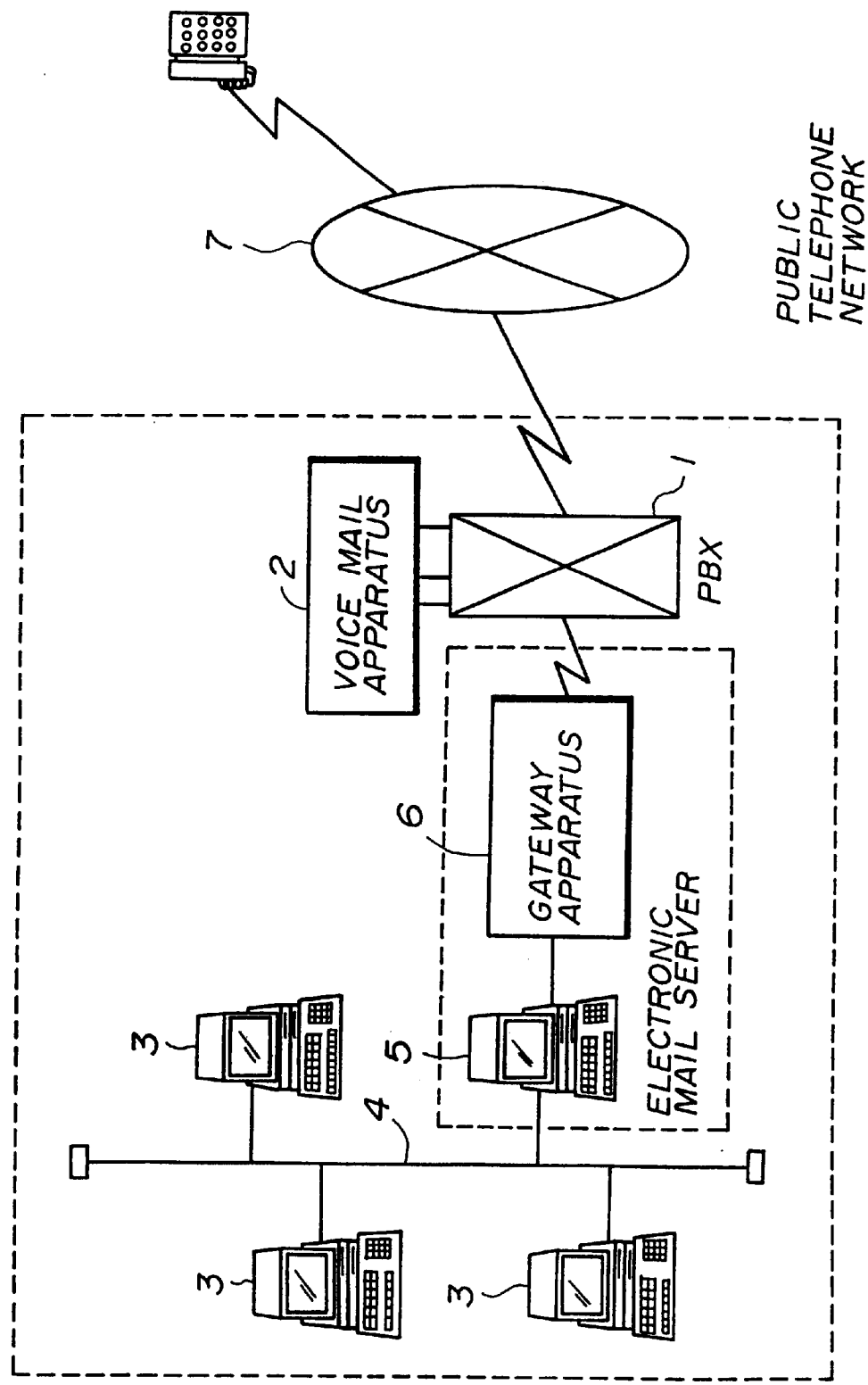
FIG. 1 is an illustration for showing an entire system in which a gateway apparatus according to a first embodiment of the present invention is provided.

A description will now be given of a first embodiment of the present invention. FIG. 1 is an illustration for showing an entire system in which a gateway apparatus according to the first embodiment of the present invention is provided.

The system shown in FIG. 1 comprises a private branch exchanger (PBX) 1, a voice mail apparatus 2 connected to the PBX 1, a plurality of personal computers 3, a local area network (LAN) 4, an electronic mail server 5 and the gateway apparatus 6 according to the first embodiment of the present invention. The PBX 1 is connected to a public telephone network 7. The personal computers 3 are connected to the LAN 4. The electronic mail server 5 is also connected to the LAN 4 so that the electronic mail server 5 can distribute electronic mail to a corresponding one of the personal computers 3 via the LAN 4.

In the system shown in FIG. 1, the gateway apparatus 6 is connected between the PBX 1 and the electronic mail server 5. The gateway apparatus 6 periodically accesses the voice mail apparatus 2 so as to check if any voice mail is received via the public telephone line 7. If there is voice mail stored in the voice mail apparatus 2, the gateway apparatus 6 retrieves the stored voice mail and converts it into a form which can be handled by the electronic mail server 5. The converted voice mail is then distributed to a designated one of the personal computers 3 via the electronic mail server 5.

Figure 2:
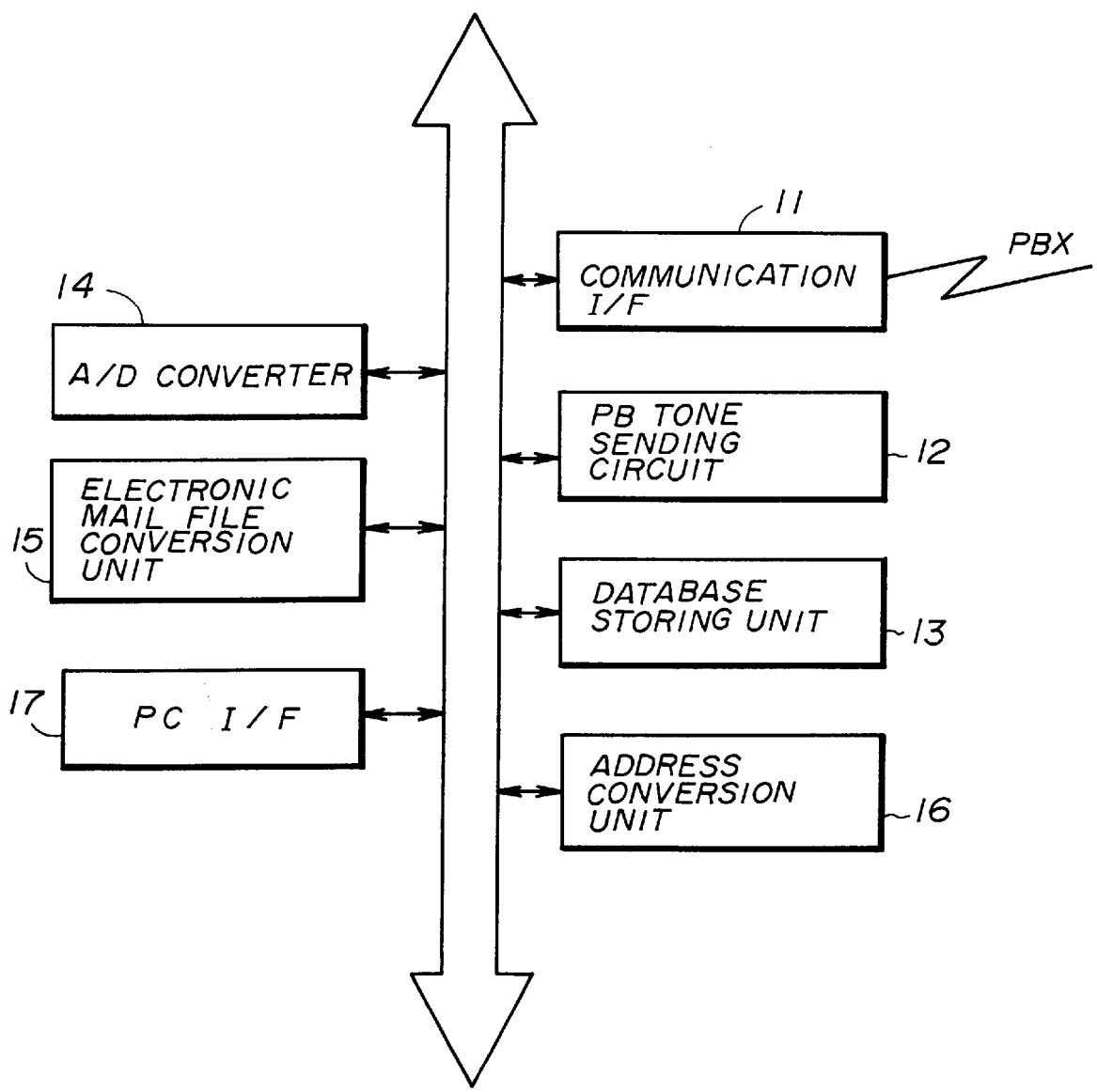
FIG. 2 is a block diagram of the gateway apparatus 6 according to the first embodiment of the present invention.

FIG. 2 is a block diagram of the gateway apparatus 6 according to the first embodiment of the present invention.

In FIG. 2, a communication interface 11 communicates with the voice mail apparatus 2 so as to retrieve a voice mail message from the voice mail apparatus 2. A PB tone sending circuit 12 is provided for retrieving information from the voice mail apparatus 2 by generating and sending a push button (PB) tone signal to the voice mail apparatus 2. A database storing unit 13 stores a voice mail program information database which is used for retrieving information from the voice mail apparatus 2. An analog-to-digital (A/D) converter 14 converts an analog voice signal into digital information. An electronic mail file conversion unit 15 converts the digital information converted by the A/p converter 14 into a data file having an electronic mail format. An address conversion unit 16 converts an electronic mail address into a voice mail box number, and converts a voice mail box number into an electronic mail address in accordance with an address conversion table stored therein. The address conversion table indicates a correspondence between a voice mail box number assigned to a user and an electronic mail address assigned to said user. A personal computer interface (PC I/F) 17 communicates with the electronic mail server 5 shown in FIG. 5. The above-mentioned units are connected to a bus line.

A description will now be given, with reference to a flowchart of FIG. 3, of an operation of the gateway apparatus 6 according to the first embodiment of the present invention.

Figure 3:
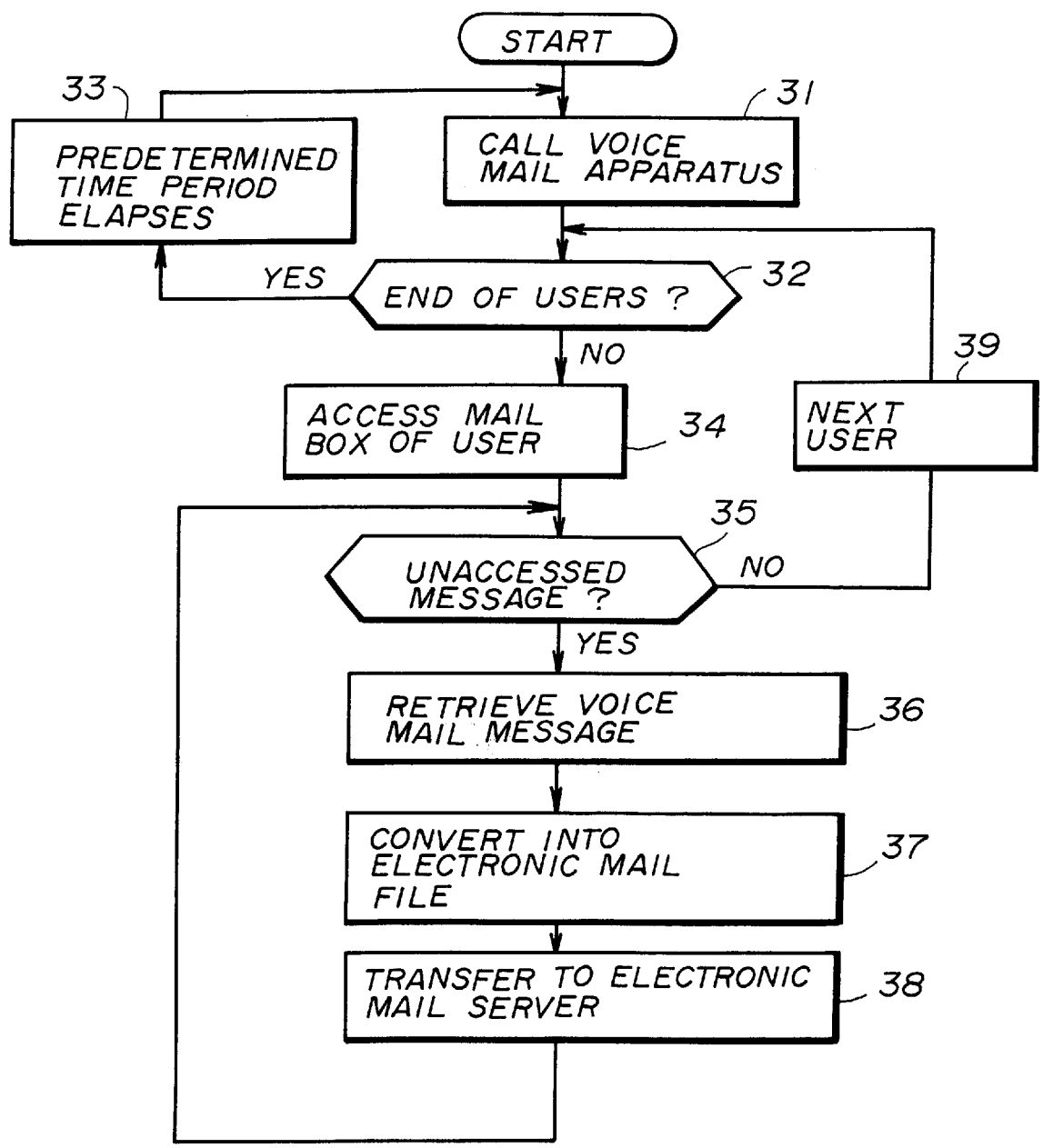
FIG. 3 is a flowchart of an operation of the gateway apparatus according to the first embodiment of the present invention.

When the operation shown in FIG. 3 is started, the gateway apparatus 6 calls, in step 31, the voice mail apparatus 2 via the PBX 1 so as to check if there is any voice mail received by the voice mail apparatus 2. The checking of the received voice mail is performed on the sequential basis of registered users. Thus, it is determined, in step 32, whether or not a user remains whose reception of voice mail should be checked in the current operation cycle.

If it is determined that there is no user remaining for checking of reception of voice mail, the routine proceeds to step 33. In step 33, a predetermined time period elapses, and then the routine returns to step 31. That is, the checking operation for the reception of voice mail is periodically performed at the predetermined time period.

On the other hand, if it is determined, in step 32, that a user remains, the routine proceeds to step 34. In step 34, the gateway apparatus 6 accesses the mail box of the currently selected user. It is then determined, in step 35, whether or not any voice mail is present in the voice mail box of the currently selected user which voice mail has not been accessed yet. That is, it is determined whether the voice mail has already been listened to by the user.

If it is determined that there is no voice mail in the voice mail box of the currently selected user, the routine proceeds to step 39. In step 39, a next user is sequentially selected for checking of the reception of voice mail. Then, the routine returns to step 32.

If it is determined, in step 35, that the voice mail which has not been accessed is present, the routine proceeds to step 36. In step 36, the voice mail is retrieved from the voice mail box of the voice mail apparatus 2. The voice mail is retrieved in the form of a regular analog voice signal. In step 37, the voice mail message is then converted into digital information by the A/D converter 14. The digital information is converted into an electronic mail file by the electronic mail file conversion unit 15. Then, the electronic mail file corresponding to the retrieved voice mail is transferred to the electronic mail server 5 so that the electronic mail file is distributed to one of the personal computers 3 assigned for the user to whom the voice mail is addressed. The routine then returns to step 35 to repeat the voice mail retrieving operation.

According to the above-mentioned first embodiment of the present invention, the voice mail can be accessed through one of the personal computers 3, and the contents of the voice mail message can be indicated on a display of one of the personal computer 3. Thus, a user can access the voice mail stored in the voice mail apparatus 2 without additional devices to be attached to each of the personal computers 3 such as a voice outputting unit and a soundboard interfacing the personal computer 3 with the voice outputting unit.

Figure 4:
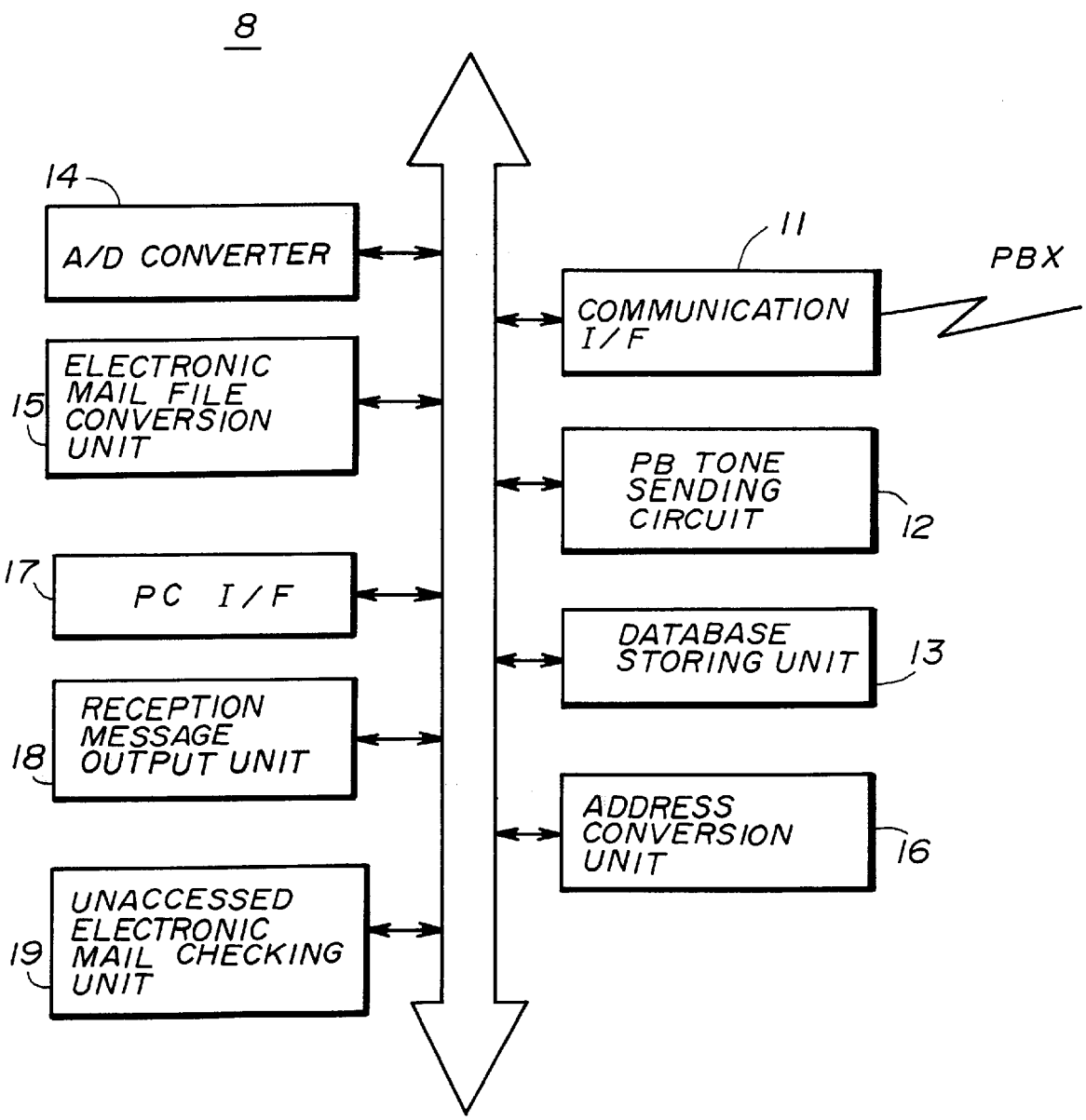
FIG. 4 is a block diagram of a gateway apparatus according to a second embodiment of the present invention.

A description will now be given of a second embodiment of the present invention. FIG. 4 is a block diagram of a gateway apparatus 8 according to the second embodiment of the present invention. In FIG. 4, parts that are the same as the parts shown in FIG. 2 are given the same reference numerals, and descriptions thereof will be omitted. The gateway apparatus 8 according to the second embodiment is used in the same system as that shown in FIG. 1.

The gateway apparatus 8 according to the second embodiment comprises a reception message output unit 18 and an unaccessed electronic mail checking unit 19 in addition to the gateway apparatus according to the above-mentioned first embodiment.

The reception message output unit 18 outputs a reception message when electronic mail is received by the electronic mail server 5. The unaccessed electric mail checking unit 19 checks if there is any unaccessed electronic mail in the electronic mail server 5.

A description will now be given, with reference to a flowchart of FIG. 5, of an operation of the gateway apparatus 8 according to the second embodiment of the present invention.

Figure 5:
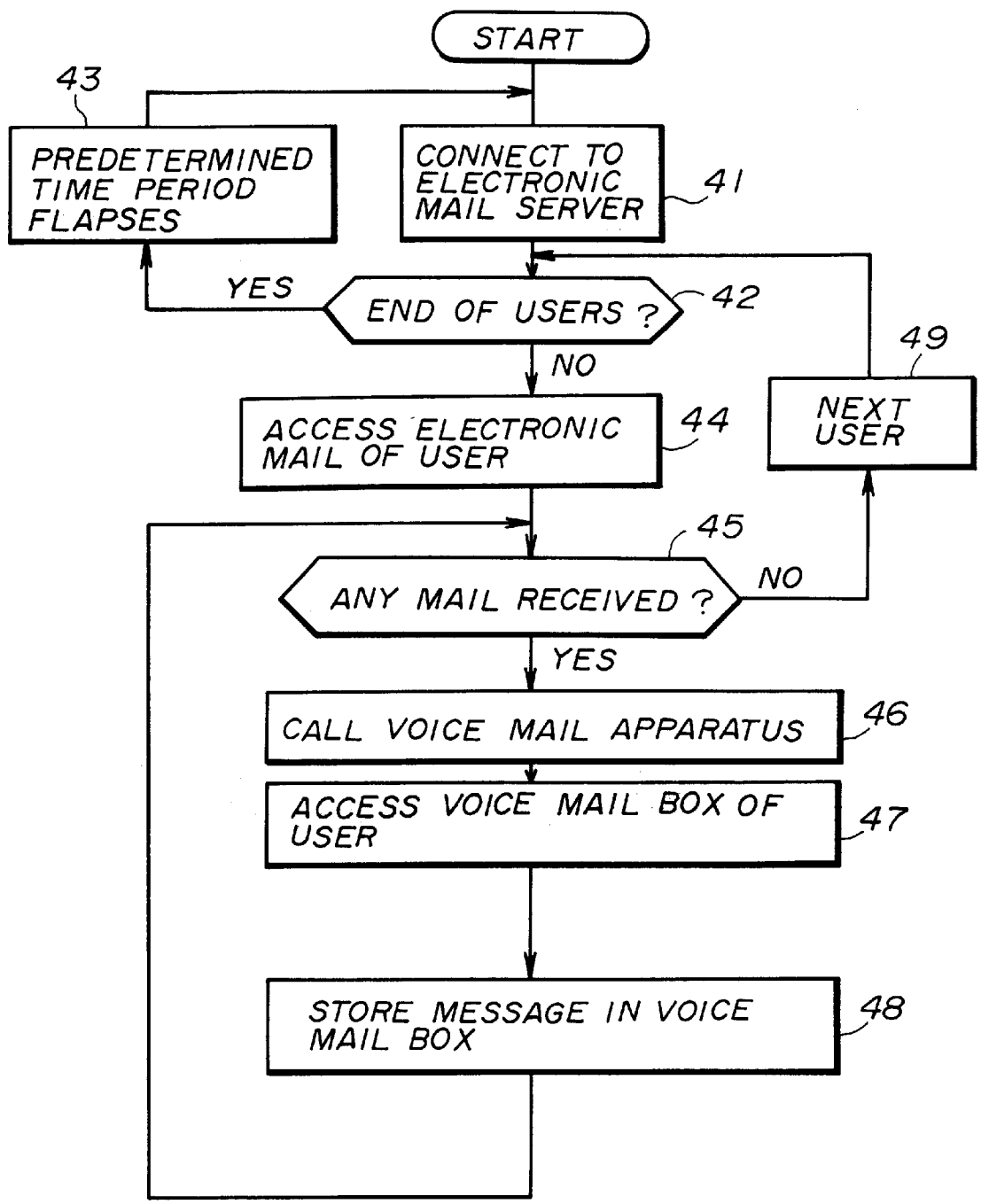
FIG. 5 is a flowchart of an operation of the gateway apparatus according to the second embodiment of the present invention.

When the operation shown in FIG. 5 is started, the gateway apparatus 8 connects to the electronic mail server 5, in step 41, so as to check if there is any electronic mail received by the electronic mail server 5. The checking of the received electronic mail is performed on the sequential basis of registered users. Thus, it is determined, in step 42, whether or not a user remains whose reception of electronic mail should be checked in the current operation cycle.

If it is determined that there is no user remaining for checking of reception of electronic mail, the routine proceeds to step 43. In step 43, a predetermined time period elapses, and then the routine returns to step 41. That is, the checking operation for the reception of electronic mail is periodically performed at the predetermined time period.

On the other hand, if it is determined, in step 42, that a user remains, the routine proceeds to step 44. In step 44, the gateway apparatus 8 accesses the electronic mail server 5. It is then determined, in step 45, by the unaccessed electronic mail checking unit 18 whether or not any electronic mail addressed to the currently selected user is present in the electronic mail server 5 which electronic mail has not been accessed yet. That is, it is determined whether the electronic mail has already been read by the user.

If it is determined, in step 45, that there is no electronic mail for the currently selected user in the electronic mail server 5, the routine proceeds to step 49. In step 49, a next user is sequentially selected for checking of the reception of electronic mail. Then, the routine returns to step 42.

If it is determined, in step 45, that the unaccessed electronic mail which has not been accessed is present, the routine proceeds to step 46. In step 46, the gateway apparatus 8 calls the voice mail apparatus 2 so as to access the voice mail box assigned for the currently selected user in step 47. Then, in step 48, the message indicating that the electronic mail has been received for the user is generated by the reception message output unit 18. The message is sent to the voice mail apparatus 2 so as to store the message in the voice mail box assigned for the user. Thereafter, the routine returns to step 45 so as to repeat the above-mentioned operation until the message storing operation is performed for all of the registered users in this operation cycle.

In the conventional electronic mail system, when a user intends to check if any electronic mail has been received by his or her personal computer from a remote place, the user must have a modem and software to access the electronic mail server 5. However, according to the second embodiment, a user can recognize through the voice mail system simply by telephone that there is electronic mail addressed to him or her without such a modem and software.

Figure 6:
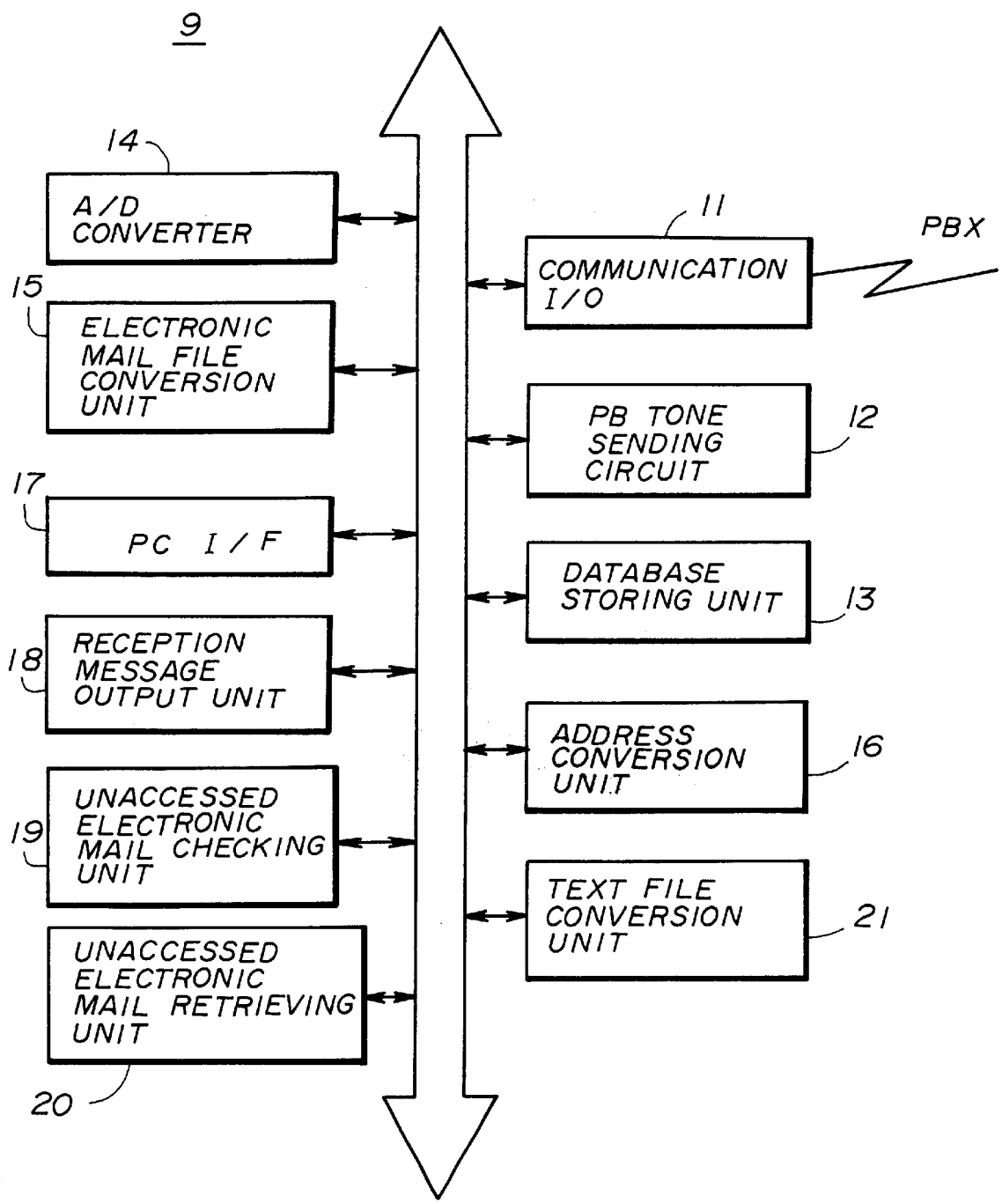
FIG. 6 is a block diagram of a gateway apparatus according to a third embodiment of the present invention.

A description will now be given of a third embodiment of the present invention. FIG. 6 is a block diagram of a gateway apparatus 9 according to the third embodiment of the present invention. In FIG. 6, parts that are the same as the parts shown in FIG. 4 are given the same reference numerals, and descriptions thereof will be omitted. The gateway apparatus 9 according to the third embodiment is used in the same system as that shown in FIG. 1.

The gateway apparatus 9 according to the third embodiment comprises an unaccessed electronic mail retrieving unit 20 and a text file conversion unit 21 in addition to the structure of the gateway apparatus 8 according to the above-mentioned second embodiment.

The unaccessed electronic mail retrieving unit 20 retrieves any unaccessed electronic mail which was received by the personal computer but has not been read by the user yet. The text file conversion unit 21 converts a text file contained in electronic mail into an analog voice signal.

A description will now be given, with reference to a flowchart of FIG. 7, of an operation of the gateway apparatus 9 according to the third embodiment of the present invention.

Figure 7:
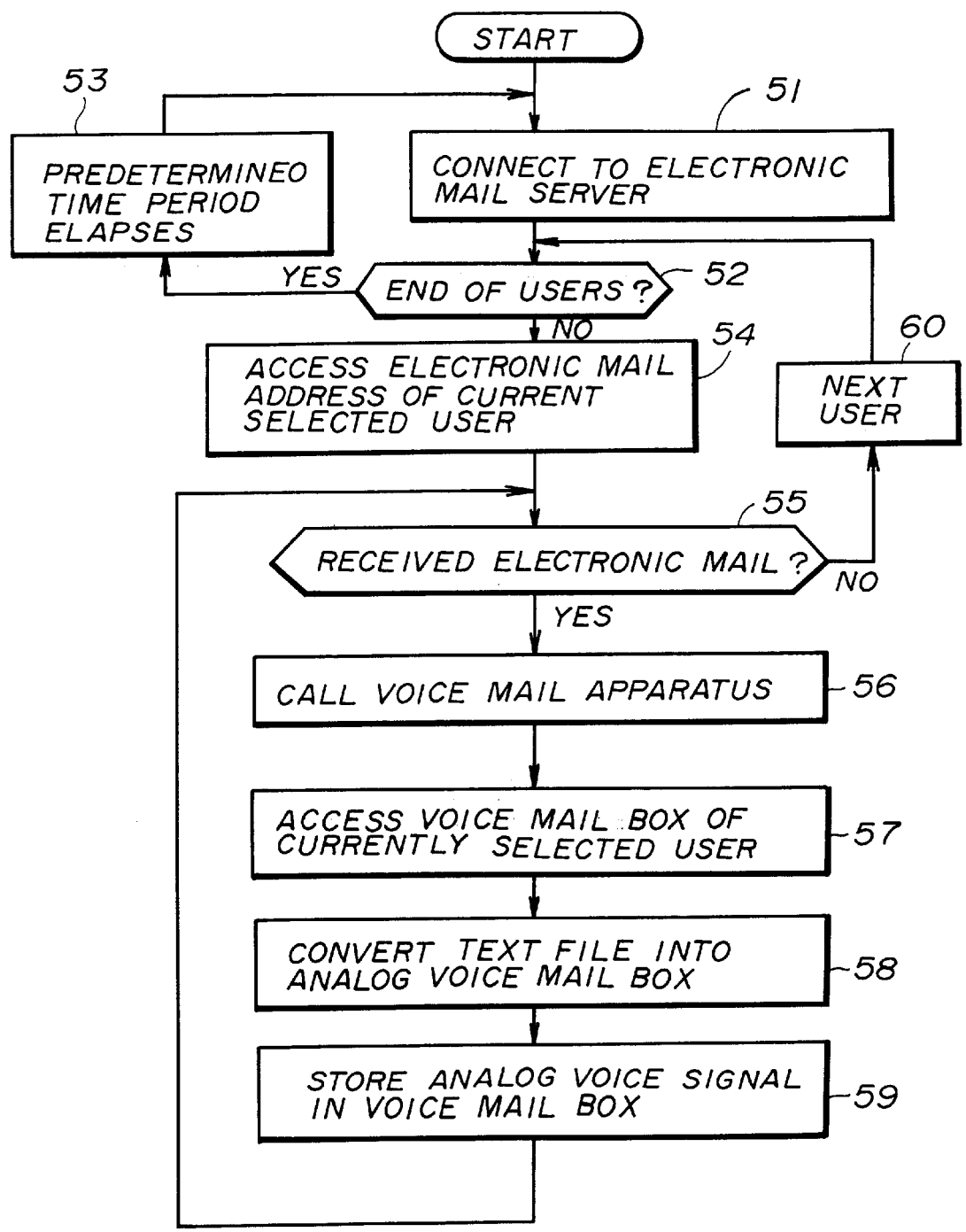
FIG. 7 is a flowchart of an operation of the gateway apparatus according to the third embodiment of the present invention.

When the operation shown in FIG. 7 is started, the gateway apparatus 9 connects to the electronic mail server 5, in step 51, so as to check if there is any electronic mail received by the electronic mail server 5. The checking of the received electronic mail is performed on the sequential basis of registered users. Thus, it is determined, in step 52, whether or not a user remains whose reception of electronic mail should be checked in the current operation cycle.

If it is determined that there is no user remaining for checking of reception of electronic mail, the routine proceeds to step 53. In step 53, a predetermined time period elapses, and then the routine returns to step 51. That is, the checking operation for the reception of electronic mail is periodically performed at the predetermined time period.

On the other hand, if it is determined, in step 52, that a user remains, the routine proceeds to step 54. In step 54, the gateway apparatus 9 accesses the electric mail address of the currently selected user in the electronic mail server 5. It is then determined, in step 55, whether or not any electronic mail addressed to the currently selected user is present in the electronic mail server 5 which electronic mail has not been accessed by the user yet.

If it is determined, in step 55, that there is no unaccessed electronic mail for the currently selected user in the electronic mail server 5, the routine proceeds to step 60. In step 60, a next user is sequentially selected for checking of the reception of electronic mail. Then, the routine returns to step 52.

If it is determined, in step 55, that the unaccessed electronic mail addressed to the currently selected user is present, the routine proceeds to step 56. In step 56, the gateway apparatus 9 calls the voice mail apparatus 2 so as to access the voice mail box assigned for the currently selected user in step 57. Then, in step 58, the text file is retrieved from the unaccessed electronic mail by the unaccessed electric mail retrieving unit 20. The retrieved text file is supplied to the text file conversion unit 21. Then, in step 58, the retrieved text file is converted into an analog voice signal by the text file conversion unit 21. In step 59, the analog voice signal is sent to the user's voice mail box in the voice mail apparatus 2, and the routine returns to step 55. The above-mentioned operation is repeated for all of the registered users.

According to the third embodiment, a user can access the contents of the electronic mail addressed to him or her from a remote place through the voice mail system by telephone without additional devices such as a modem and software. Additionally, the user can access both the voice mail and the electronic mail by a single call.

The present invention is not limited to the specifically disclosed embodiments, and variations and modifications may be made without departing from the scope of the present invention.

What is claimed is:

1. A gateway apparatus connected between an electronic mail server and a public telephone network, said gateway apparatus communicating with a voice mail apparatus via a telephone line, said electronic mail server being connected to at least one personal computer, said gateway apparatus comprising:

voice mail retrieving means for retrieving voice mail addressed to a selected user from said voice mail apparatus, said voice mail retrieving means retrieving the voice mail via a private branch exchanger connected to the public telephone network by transmitting push button tone signals to said voice mail apparatus to access a voice mail box of the user;

voice mail converting means comprising an analog-to-digital converter for converting the voice mail into electronic mail by converting an analog voice signal corresponding to a voice message contained with the voice mail into digital data conforming to electronic mail, said digital data in the electronic mail corresponding to a complete textual conversion of the voice message;

box number converting means for converting a voice mail box number corresponding to the voice mail box of the retrieved voice mail into an electronic mail address which is assigned for the selected user, wherein the voice mail box number is converted to the assigned electronic mail address after the voice mail is retrieved by the voice mail retrieving means; and transferring means for transferring the electronic mail to the electronic mail server so that the electronic mail is distributed to the personal computer connected to said electronic mail server in accordance with the electronic mail address obtained by said box number converting means.

2. The gateway apparatus as claimed in claim 1, wherein a retrieval of the voice mail for each user is periodically performed at a predetermined time interval.

3. The gateway apparatus as claimed in claim 1, wherein said box number converting means converts the voice mail box number into the electronic mail address in accordance with a predetermined address conversion table.

4. The gateway apparatus as claimed in claim 1, further comprising:

unaccessed electronic mail searching means for searching for unaccessed electronic mail which was received by said electronic mail server and has not been accessed by a particular user to whom the unaccessed electronic mail is addressed;

electronic mail address converting means for converting an electronic mail address corresponding to the unaccessed electronic mail into a voice mail box number which is assigned to said particular user; and message outputting means for outputting to said voice mail apparatus a voice message announcing a presence of the unaccessed electronic mail so that said voice message is stored at a voice mail box number of said particular user.

5. The gateway apparatus as claimed in claim 4, wherein said electronic mail address converting means converts the electronic mail address into the voice mail box number in accordance with a predetermined address conversion table.

6. The gateway apparatus as claimed in claim 4, wherein said voice message announcing the presence of the unaccessed electronic mail is an analog voice signal conforming to voice mail.

7. The gateway apparatus as claimed in claim 1, further comprising:

unaccessed electronic mail retrieving means for retrieving unaccessed electronic mail which was received by said electronic mail server and has not been accessed by a particular user to whom the unaccessed electronic mail is addressed;

text file converting means for converting a text file contained in the unaccessed electric mail into a voice signal;

electronic mail address converting means for converting an electronic mail address corresponding to the unaccessed electronic mail into a voice mail box number which is assigned to said particular user; and voice signal outputting means for outputting said voice signal to said voice mail apparatus so that said voice signal is stored at a voice mail box number of said particular user.

8. The gateway apparatus as claimed in claim 7, wherein said electronic mail address converting means converts the electronic mail address into the voice mail box number in accordance with a predetermined address conversion table.

9. The gateway apparatus as claimed in claim 7, wherein said voice signal output to said voice mail apparatus is an analog voice signal conforming to voice mail.

10. A gateway apparatus connected between an electronic mail server and a public telephone network, said gateway apparatus communicating with a voice mail apparatus via a telephone line, said electronic mail server being connected to at least one personal computer, said gateway apparatus comprising:

voice mail retrieving means for retrieving voice mail addressed to a selected user from said voice mail apparatus, said voice mail retrieving means retrieving the voice mail via a private branch exchanger by transmitting push button tone signals to said voice mail apparatus to access a voice mail box of the user;

voice mail converting means comprising an analog-to-digital converter for converting the voice mail into electronic mail by converting an analog voice signal corresponding to a voice message contained with the voice mail into digital data conforming to electronic mail, said digital data in the electronic mail corresponding to a complete textual conversion of the voice message;

box number converting means for converting a voice mail box number corresponding to the voice mail box of the retrieved voice mail into an electronic mail address which is assigned for the selected user, wherein the voice mail box number is converted to the assigned electronic mail address after the voice mail is retrieved by said voice mail retrieving means; and transferring means for transferring the electronic mail to the electronic mail server so that the electronic mail is distributed to the personal computer connected to said electronic mail server in accordance with the electronic mail address obtained by said box number converting means.

* * * * *